United States Patent Office 3,340,478
Patented Sept. 5, 1967

3,340,478
METHOD OF AND ARRANGEMENT FOR CONTROLLING THE FEED IN CONNECTION WITH ELECTROEROSIVE MACHINING
Karl Otto August Poerschke, Aachen, Germany, assignor to Beteiligungs- und Patentverwaltungsgesellschaft-mit beschränkter Haftung, Essen, Germany
Filed Nov. 29, 1963, Ser. No. 326,691
Claims priority, application Germany, Nov. 30, 1962,
B 69,813
4 Claims. (Cl. 328—134)

The present invention relates to a method of and arrangement for controlling the feed of an electrode tool in connection with the electroerosive machining by electrically conducting electrodes with frequency controlled discharges. A system such as that shown in U.S. Patent 2,841,686 to Williams, for example, could be controlled by the apparatus of the present invention. With heretofore known methods of the type involved, generally the feed control is effected in conformity with the mean voltage and/or the mean current in the discharge circuit.

It is an object of the present invention to provide an improved and simplified method of controlling the feed of electrode tools.

These and other objects and advantages of the invention will appear more clearly from the following specification in connection with the accompanying drawings, in which.

Figure 1:
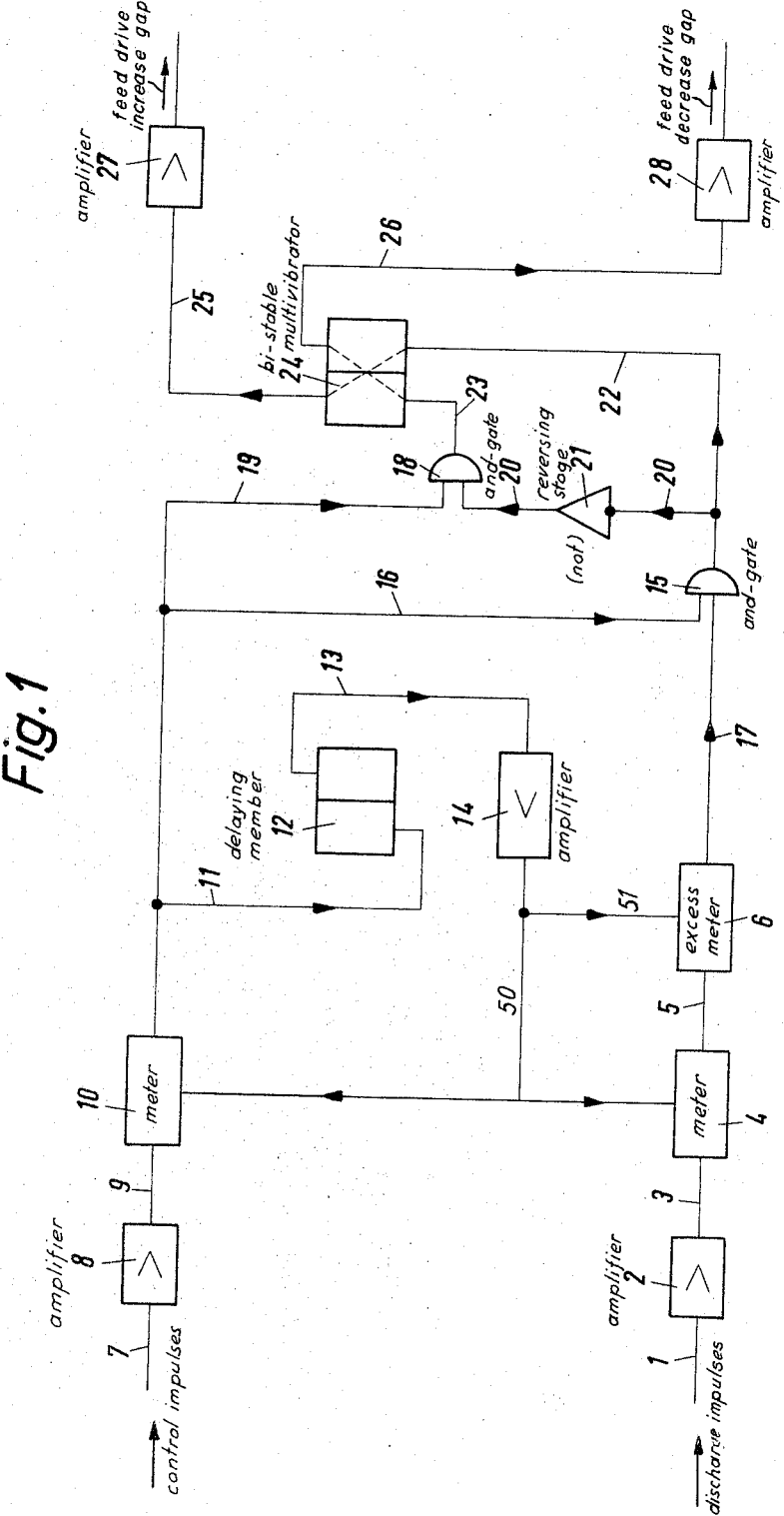
FIG. 1 illustrates a schematic circuit of a two-point control.

The present invention is based on the fact that the number of discharge impulses must be less, as far as possible, than the number of the control impulses. This is due to fact that within a certain time period the number of discharge impulses cannot be higher than the number of the control impulses. However, inasmuch as the discharge impulses bring about an electroerosive removal of material from the electrode tool, it is possible to adjust the feed control in conformity with the above mentioned characteristic. If the number of the discharge impulses within a certain time period is considerably less than the number of the control impulses, this will be an indication for the fact that the discharge gap is too wide. If, however, the number of the discharge impulses within a certain time period is very close to the number of the control impulses, this will be an indication for the fact that the discharge gap has decreased to such an extent that it has come into the range of its minimum permissible magnitude.

Taking into consideration the above mentioned facts, the present invention is characterized primarily in that the produced control impulses and the occurring discharge impulses are counted and that the number of the two kinds of impulses which are counted within the same time period by two meters are compared with each other and that finally deviations from a predetermined nominal value are converted into directed signals for the feed drive. If it is assumed for instance that within a certain time period 200 control impulses and 180 discharge impulses represent the possible optimum condition, a signal will be produced at 170 discharge impulses for 200 control impulses which signal will actuate the feed drive in a sense to decrease the discharge gap, whereas at 190 discharge impulses for 200 control impulses a signal will be produced which actuates the feed drive in a sense to increase the discharge gap.

The method according to the invention may be carried out in such a way that in response to each deviation from the nominal value, for instance 180 discharge impulses for 200 control impulses, a signal will be produced (two-point control). However, the method according to the invention may also be carried out in such a way that in response to a deviation from the nominal value, for instance 180 discharge impulses for 200 control impulses, up to a certain limit, for instance 175 discharge impulses on one hand and 185 discharge impulses on the other hand, no signal will be produced (three-point control).

Advantageously, the method according to the present invention may be practiced in such a way that the length of the time period for comparing the number of the two kinds of impulses will each time be determined by a predetermined number of control impulses. This means that the comparison can each time be carried out when the meter for the control impulses has received a predetermined number of such impulses, for instance 200.

In conformity with the method according to the present invention it is particularly advantageous at the end of each time period to reset the meter with delay to its starting position. The delay has the purpose to hold available the values stored in the meter until a signal has been given to the feed control.

For practicing the method according to the present invention, a circuit is particularly suited in which one signal-emitter each for the control and discharge impulses is connected to the input side of a meter (if desired through the intervention of an amplifier) and in which the meter for the discharge impulses is followed by an excess meter which receives signals from said first meter in excess of a predetermined number of signals received by said first meter. The circuit or arrangement of the present invention is furthermore characterized in that the output sides of the meter for the control impulses and of the excess meter are connected with an evaluator. With such an arrangement, the excess meter becomes effective only when within the predetermined time period the meter for the discharge impulses received more of such impulses than corresponds to the predetermined nominal value for which it has been adjusted. It is only then that the excess meter at the end of the respective time period will send an impulse to the said evaluator.

A further possibility of designing the circuit consists in that the output side of the meter for the discharge impulses is additionally connected to the input side of a delaying member the output side of which is likewise connected to the evaluator. In such a circuit a signal can be emanated from the delaying member only when the meter for the discharge impulses has within the said predetermined time period received more of the impulses than corresponds to the adjusted nominal value. The signal sent to the evaluator may then be employed for preventing the formation of a signal in the evaluator for the feed drive when the number of the discharge impulses within said predetermined time period was higher by one impulse than the nominal value.

If desired, a further delaying member may be connected to the output side of the meter or memory device for the control impulses, and the said additional delaying member may be connected, if desired through an amplifier, with resetting means for the meters and the excess meter.

The circuit in the evaluator may be so designed that the input side of a first and-gate is connected to the output side of the meter for the control impulses and of the excess meter while the input side of a second and-gate is connected with the output sides of the meter for the control impulses and of a reversing stage connected to the output side of the first and-gate. The output sides of the two and-gates are connected with the input side of a bi-stable multi-vibrator the output side of which is connected to the feed drive. Such an arrangement corresponds to a two-point control which means that the output side of the bi-stable multi-vibrator (flip-flop arrangement) always sends a signal to the feed drive.

A further possibility for the design of the circuit in the evaluator part consists in that the input side of a first and-gate is connected with the output sides of the meter for the control impulses and of the excess meter while the input side of a second and-gate is connected with the output sides of the meter for the control impulses and of a reversing stage connected to the output side of the first and-gate. The input side of a third and-gate is connected to the output sides of the meter for the control impulses and of a delaying member following the meter for the discharge impulses. The output sides of the first and-gate and of the second and-gate are simultaneously connected with the input sides of an or-gate and of a first bi-stable multi-vibrator. The output sides of the third and-gate and of the or-gate are connected with the input side of a second bi-stable multi-vibrator. The input sides of a fourth and a fifth and-gate are connected with the output side of the first bi-stable multi-vibrator and with the only output side of the second bi-stable multi-vibrator. The output sides of the fourth and fifth and-gates are connected to the feed drive. This arrangement corresponds to a three-point control which means that the fourth or fifth and-gate will give off a signal to the feed drive only when the number of the discharge impulses within the predetermined time period differs from the adjusted nominal value. If no difference occurs, the evaluator will according to this arrangement send no signal to the feed drive.

Referring now to the drawings in detail and FIG. 1 thereof in particular, discharge impulses emanating from a standard circuit for electro-erosion machining with frequency controlled discharges are through a line 1 and an amplifier 2 and a further line 3 conveyed to a meter or memory device 4. Connected to the output side of the meter 4 through a line 5 is an excess meter 6. Furthermore emanated by the circuit for electroerosion machining with frequency controlled discharges are control impulses which through a line 7 are conveyed to an amplifier 8 and through a further line 9 are conveyed to a meter or memory device 10. Connected to the output side of a meter 10 through line 11 is a delaying member 12 with a delay of 20 μ-second. The output side of the member or device 12 is through a line 13, amplifier 14 and additional lines 50 and 51 connected to resetting devices in the meters 4 and 10 and the excess meter 6. The input side of a first and-gate 15 is through line 16 connected with the output side of meter 10 and through a line 17 connected with the output side of the excess meter 6. Furthermore, the input side of a second and-gate 18 is through a line 19 connected to the output side of meter 10 and through line 20 connected to an interposed reversing stage 21 and through the latter to the output side of the first and-gate 15.

As will furthermore be evident from FIG. 1, in the arrangement shown therein (two-point control), the output sides of the and-gates 15 and 18 are through lines 22 and 23 connected to the input side of a bi-stable multi-vibrator 24. The output side of said multi-vibrator 24 is through lines 25 and 26 and amplifiers 27 and 28 connected to the feed drive.

With the arrangement of FIG. 1, the intended effect will be obtained by the meter 10 receiving control impulses up to a predetermined number corresponding to the predetermined time period, while simultaneously the meter 4 receives the discharge impulses. At the end of the time period defined, for instance, by 200 control impulses, the meter 10 sends off a signal from its output side. If, now, the number of the discharge impulses is less than the nominal value of, for instance, 180 discharge impulses in conformity with the nominal value adjusted on the meter 4, this will be an indication for the fact that the excess meter 6 has received no impulses, and the excess meter 6 will not send off any signal through line 17 to the first and-gate 15. The signal emitted by meter 10 through line 16 to the first and-gate 15 will, therefore, not cause the emitting of a signal by the first and-gate 15 to the lines 20 and 22. However, the second and-gate 18 will, from meter 10 through line 19 and from the reversing stage 21 through line 20 receive signals, so that the second and-gate 18 will through line 23 emit a signal to the bi-stable multi-vibrator 24. As a result thereof, the bi-stable multi-vibrator 24 will, through line 26 and amplifier 28 emit a signal to the feed drive, in a sense to decrease the discharge gap. If, however, meter 4 has during the predetermined time period received more discharge impulses than corresponds to the adjusted nominal value, impulses will have reached the excess meter 6 which latter at the end of the said predetermined time period will, through line 17 emit a signal to the first and-gate 15.

Furthermore, the first and-gate 15 will receive a signal from meter 10 through line 16. Consequently, the first and-gate 15 will emit a signal to the lines 20 and 22, which signal, however, in view of the effect of the reversing stage 21, will not pass through line 20 to the second and-gate 18. Consequently, the signal emitted by meter 10 through line 19 to the second and-gate 18 will remain without effect, and no signal will pass through line 23 from the second and-gate 18 to the bi-stable multi-vibrator 24. However, the signal emitted from the first and-gate 15 will through line 22 reach the bi-stable multi-vibrator 24 and in the latter will release a signal which, through line 25 and amplifier 27, will be conveyed to the feed drive, in a sense to increase the discharge gap. The signal, which at the end of the said time period will be emanated by meter 10, passes through line 11, delay member 12, further line 13 and amplifier 14 to the resetting devices of meters 4 and 10 and of the excess meter 6.

Figure 2:
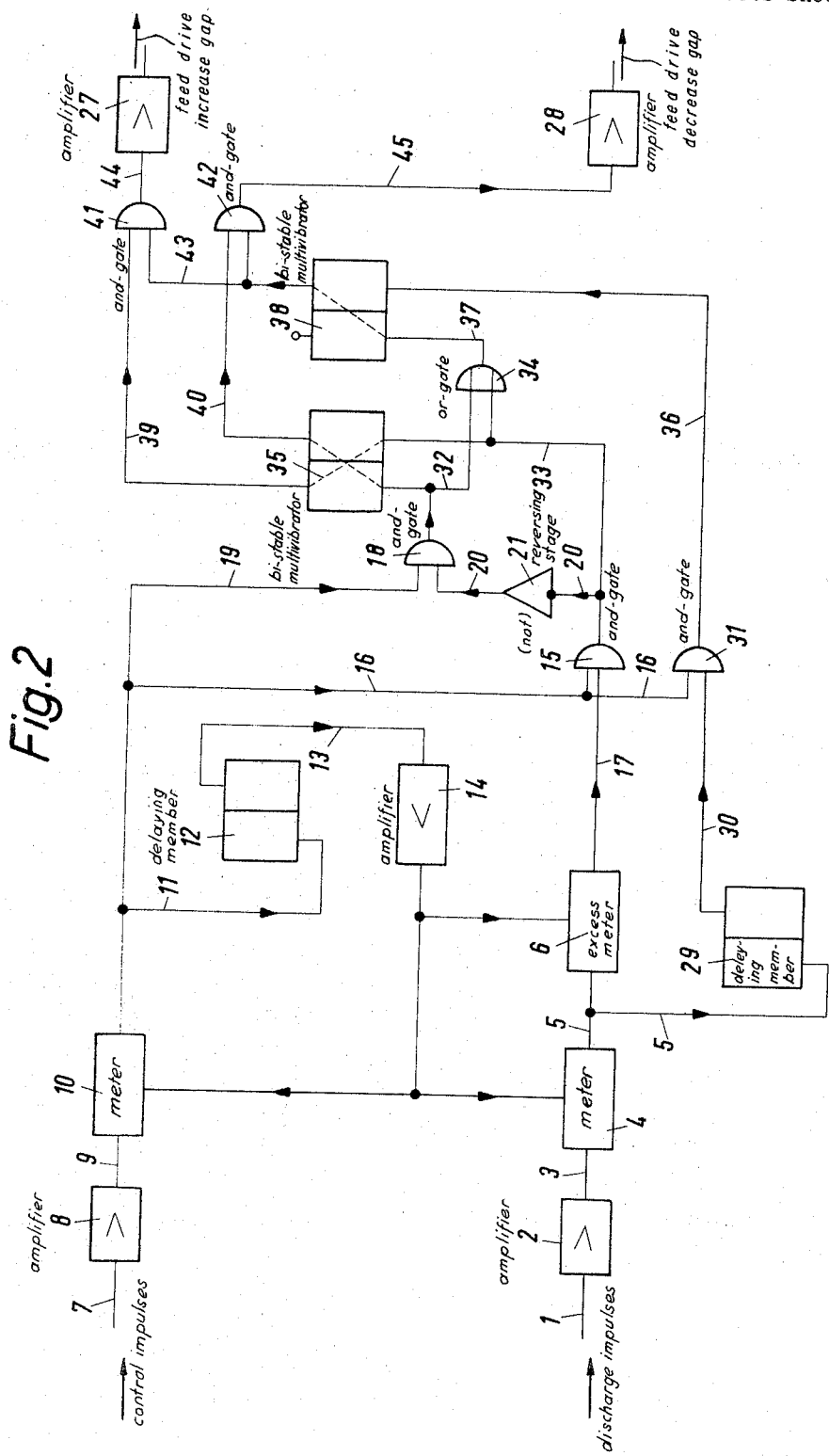
FIG. 2 is a diagrammatic circuit of a three-point control.

Referring now to the arrangement of FIG. 2, (three-point control) it will be noted that the output side of meter 4 is, in distinction from the arrangement of FIG. 1, additionally connected through line 5 with the input side of a delay member 29. The output side of the delay member 29 is, through a line 30, connected to the input side of a third and-gate 31 the input side of which communicates through line 16 with the output side of meter 10. The output sides of the first and second and-gates 15 and 18 are, through lines 33 and 32, simultaneously connected to the input side of an or-gate 34 and a bi-stable multi-vibrator 35. The output sides of the third and-gate 31 and of the or-gate 34 are, through lines 36 and 37 connected to the input side of a second bi-stable multi-vibrator 38. The output side of the first bi-stable multi-vibrator 35 is, through lines 39 and 40 connected to the input sides of the fourth and fifth and-gates 41 and 42. Connected to the input sides of the fourth and fifth and-gates 41 and 42 through line 43 is the single output of the second bi-stable multi-vibrator 38, the other output terminal of said multi-vibrator 38 being without connection. The output sides of the fourth and fifth and-gates 41 and 42 are, through lines 44 and 45 and amplifiers 27 and 28 connected to the feed drive.

The arrangement of FIG. 2 brings about the desired effect by meter 10 receiving control impulses up to a predetermined number corresponding to the predetermined time period, while simultaneously, meter 4 receives discharge impulses. At the end of the said predetermined time period defined, for instance, by 200 control impulses, meter 10 will send off a signal from its output side. If, now, the number of the discharge impulses is less than the nominal value adjusted on the meter 4, of, for instance, 180 discharge impulses, this will be an indication for the fact that neither the excess meter 6 nor the delay member 29 have, through line 5, received an impulse, so that the excess meter 6 and the delay member 29 will send no signals through lines 17 and 30 to the first and third and-gates 15 and 31. The signals emitted by meter 10 through line 16 to the first and third and-gates 15 and 31 will thus remain without effect, and the first and third and-gates 15 and 31 will emit no signals through lines 20, 33 and 36. However, through the reversing stage 21 and line 20, a signal will pass to the second and-gate 18. Since, simultaneously, a signal from meter 10 passes to the second and-gate 18 through line 19, the second and-gate 18 will, through line 32, send off a signal to the first bi-stable multi-vibrator 35 and to the or-gate 34. The or-gate 34 will therefore, through line 37, emit a signal to the second bi-stable multi-vibrator 38 which in its turn, through line 43, emits a signal to the fifth and-gate 42. The first bi-stable multivibrator 35 will, through line 40, likewise emit a signal to the fifth and-gate 42 so that the latter will, through line 45 and amplifier 28 send a signal to the feed drive, in the sense of decreasing the discharge gap.

If, however, during the said predetermined time period, meter 4 has received more discharge impulses than corresponds to the adjusted nominal value, impulses will also have been received by the excess meter 6, which latter, through line 17, will then emit a signal to the first and-gate 15. Since the delay member 29 does not store impulses, the delay member 29 will, at the end of the said time period, through line 30, send no signal to the third and-gate 31. The signal emanated by meter 10 and passing through line 16 to the first and-gate 15 brings about that the first and-gate 15 will send off a signal through lines 20 and 33, whereas the signal sent by meter 10 through line 16 to the third and-gate 31 will remain without effect, so that the third and-gate 31 will not send a signal to line 36. Also without effect will remain the signal which was sent by meter 10 through line 19 to the second and-gate 18 because the second and-gate 18 receives no signal through the reversing stage 21 and the line 20. Consequently, the second and-gate 18 will give no signal to line 32. The signal sent off by the first and-gate 15 through line 33 passes to the first bi-stable multi-vibrator 35 which, therefore, through line 39 sends a signal to the fourth and-gate 41, and to the or-gate 34. Or-gate 34, in its turn, will through line 37 send a signal to the second bi-stable multi-vibrator 38, which latter through line 43 sends a signal to the fourth and-gate 41. Consequently, the fourth and-gate 41 will, through line 44 and amplifier 27 send a signal to the feed drive, in the sense to increase the discharge gap.

If, during the predetermined time period, meter 4 will receive only one discharge impulse in excess of the adjusted nominal value, meter 4 will send an impulse through line 5 to the delay member 29 which, in its turn, through line 30, will send a signal to the third and-gate 31. The excess meter 6 will, however, at this time still be ineffective so that meter 6 will send no signal through line 17 to the and-gate 15. The signal sent by meter 10 through line 16 to the third and-gate 31 brings about that the third and-gate 31 will emit a signal to line 36, while the signal sent by meter 10 through line 16 to the first and-gate will remain without effect. Consequently, no signal will be emitted by the first and-gate 15 to lines 20 and 33. In view of the reversing stage 21, the second and-gate 18 will receive a signal through line 20. Moreover, the second and-gate 18 will from meter 10 receive a signal through line 19, so that the second and-gate 18 will send a signal to line 32. This signal passes through the first bi-stable multi-vibrator 35 and the connection 40 to the fifth and-gate 42, and through the or-gate 34, line 37, second bi-stable multi-vibrator 38 and line 43 will likewise pass to the fifth and-gate 42. This effect, however, will be annulled and made ineffective by the fact that the signal in line 36, due to the preceding delay member 29, passes at a delay through the second bi-stable multi-vibrator 38 and thus returns the latter to its dead start. In this way, the emitting of any signals from fourth and fifth and-gates 41 and 42, will be prevented. The feed drive will receive no signals.

Meters of the type designated in the drawings as meters 4, 6 and 10 with resetting means are well known in the art and are described, for instance, in "Digital Computer Components and Circuits" by R. K. Richards, pages 398 to 404.

It is of course, to be understood that the present invention is, by no means, limited to the particular arrangements shown in the drawings, but also comprises any modifications within the scope of the appended claims.

What I claim is:

1. An apparatus for controlling the feeding of a tool electrode in connection with the electro-erosive machining of work pieces by frequency controlled impulses, which comprises: a discharge impulse emitter and a control impulse emitter, first meter means having an input side adapted to be connected to said discharge impulse emitter and also having an output side, second meter means having an input side adapted to be connected to said control impulse emitter and also having an output side, excess meter means having an input side connected to the output side of said first meter means and adapted to receive from said first meter means discharge impulses received by the latter within a certain time period in excess of a certain number, a first and-gate having an input side connected to the output side of said second meter means and to the output side of said excess meter means, a second and-gate having an input side connected to the output side of said second meter means, a reversing stage having an input side connected to the output side of said first and-gate and having an output side connected to the input side of said second and-gate, and a bi-stable multi-vibrator having an input side connected to the output sides of said first and second and-gates and having an output side adapted to be connected to a feed drive for an electrode tool.

2. An apparatus for controlling the feeding of a tool electrode in connection with the electro-erosive machining of work pieces by frequency controlled impulses, which comprises: a discharge impulse emitter and a control impulse emitter, first meter means having an input side adapted to be connected to said discharge impulse emitter and also having an output side, second meter means having an input side adapted to be connected to said control impulse emitter and also having an output side, excess meter means having an input side connected to the output side of said first meter means and adapted to receive from said first meter means discharge impulses received by the latter within a certain time period in excess of a certain number, first and-gate means having an input side connected to the output side of said second meter means and to the output side of said excess meter means, second and-gate means having an input side connected to the output side of said second meter means, a reversing stage having an input side connected to the output side of said first and-gate means and having an output side connected to the input side of said second and-gate means, third and-gate means having an input side connected to the output side of said second meter means, delaying means having an output side connected to the input side of said third and-gate means and an input side connected to the output side of said first meter means, or-gate means having an input side connected to the output sides of said first and second and-gate means, a first bi-stable multi-vibrator having an input side connected to the output sides of said first and second and-gate means, a second bi-stable multi-vibrator having an input side connected to the output side of said third and-gate means and to the output side of said or-gate means, a fourth and-gate and a fifth and-gate, said fourth and said fifth and-gate having an input side connected to the output side of said first bi-stable multi-vibrator and to the output side of said second bi-stable multi-vibrator, said fourth and fifth and-gates having output sides adapted to be connected with a feed drive for an electrode tool.

3. An apparatus according to claim 1 which includes delaying means having an input side connected to the output side of said second meter means and also having an output side, each of said first, second and excess meter means having a reset terminal, and the output side of said delaying means being connected to said reset terminals.

4. An apparatus according to claim 2 which includes further delaying means having an input side connected to the output side of said second meter means and also having an output side, each of said first, second and excess meter means having a reset terminal, and the output side of said further delaying means being connected to said reset terminals.

References Cited

UNITED STATES PATENTS 2,986,699    5/1961    McHenry _____ 328—134 X

ARTHUR GAUSS, *Primary Examiner.*

J. ZAZWORSKY, *Assistant Examiner.*